(12) United States Patent
Jones et al.

(10) Patent No.: US 7,507,969 B1
(45) Date of Patent: Mar. 24, 2009

(54) RUGGEDIZED RADIATION DETECTOR

(75) Inventors: Keith Jones, Macedonia, OH (US); Lucas Clarke, Brussels (BE); Brian Palmer, Perkasie, PA (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 11/518,774

(22) Filed: Sep. 11, 2006

(51) Int. Cl.
*G01T 1/20* (2006.01)

(52) U.S. Cl. .................................. 250/368; 250/361 R

(58) Field of Classification Search .................. 250/368, 250/361 R
See application file for complete search history.

(56) References Cited

U.S. PATENT DOCUMENTS

| | | | | |
|---|---|---|---|---|
| 3,152,698 A | * | 10/1964 | Maddox | ................ 211/126.15 |
| 5,047,635 A | * | 9/1991 | Leaney et al. | ............... 250/256 |
| 5,962,855 A | * | 10/1999 | Frederick et al. | ........ 250/361 R |
| 6,355,932 B1 | | 3/2002 | Frederick | |
| 7,154,098 B2 | * | 12/2006 | Clarke et al. | ................ 250/368 |
| 7,170,061 B2 | * | 1/2007 | Clarke et al. | ............ 250/361 R |
| 2005/0184241 A1 | * | 8/2005 | Clarke et al. | ................ 250/368 |
| 2005/0224717 A1 | * | 10/2005 | Clarke et al. | ............ 250/361 R |
| 2007/0080297 A1 | * | 4/2007 | Clarke et al. | ................ 250/366 |

* cited by examiner

*Primary Examiner*—John R Lee
(74) *Attorney, Agent, or Firm*—Edward J. Smith; Ernest G. Cusick; Frank A. Landgraff

(57) ABSTRACT

A radiation detector assembly is provided. The radiation detector assembly includes a radiation detector element and a light detection element operationally connected to the radiation detector element. The radiation detector element is seated within a housing. The assembly also includes a plurality of continuous wave formed springs located along the outer periphery of the radiation detector element, radially between the housing and the radiation detector element.

11 Claims, 6 Drawing Sheets

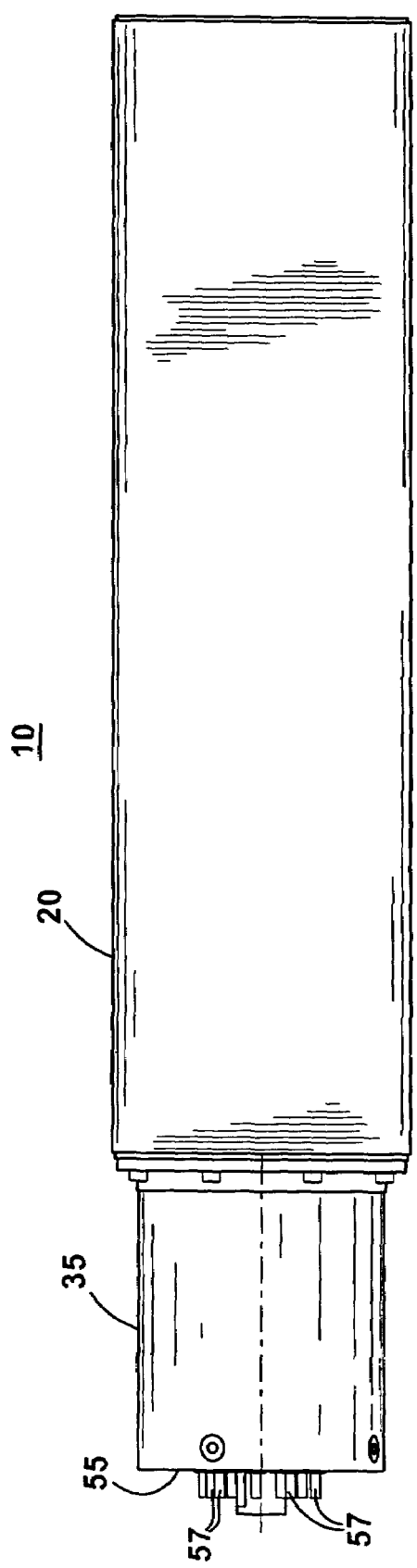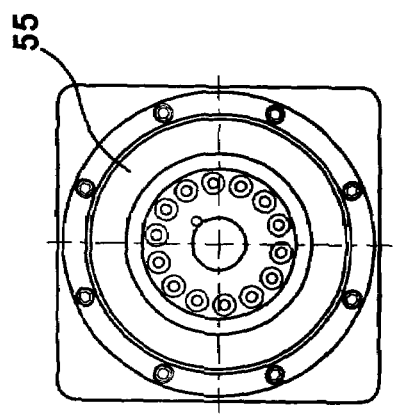

RUGGEDIZED RADIATION DETECTOR

BACKGROUND OF THE INVENTION

The invention relates generally to a suspension system for protection of devices mounted in an external housing and more specifically to a suspension system for a ruggedized radiation detector.

Radiation detectors typically include a light detecting and quantifying device, such as a photo-multiplier tube, and a scintillation element that may be a crystal or suitable compounded element. The scintillation element functions by capturing radiation from its surroundings and converting that energy into light. The radiation may be ambient background radiation or radiation emitting material that has been transported into proximity with the radiation detector.

Light generated within the scintillation element, as a result of impingement by radiation, is transmitted through an optical window into the photo-multiplier tube. The light impulses are transformed into electrical impulses that are transmitted to an instrumentation system. Optical coupling elements are normally used between the scintillation element and the light-detecting element in order to achieve better light transmission, and may be used to provide dynamic isolation between the scintillation element and the light-detecting element.

Portal radiation monitoring has taken on increased significance with the contemporary potential for illegal transportation of nuclear weapons, dirty bombs and other illicit radioactive materials. Effective portal monitoring for radiation offers a way to identify and thwart the improper transport and use of these radiation emitting materials. However, as the means for transport of the radioactive materials is multifaceted, portal monitoring must be applied to a broad set of transportation schemes. Among the modes of transport for which portal radiation monitoring must be conducted are shipments by sea, train, vehicle and by personnel. Consequently, the portal radiation monitoring equipment, including the radiation detectors, are exposed to a broad variety of environmental conditions.

Existing portal monitoring radiation detectors are often subjected to varying degrees of shock or vibration during their normal usage. In some cases, the degree of shock or vibration exposure may be quite severe. It is advantageous to protect radiation detectors so that they will not suffer any deleterious effects from the shock and vibration. Examples of these effects may include high background counts, noise in the detector's response spectrum, and even breakage of the detector. Typical methods of protecting these detectors have comprised the use of thick elastomers, foams, etc.

Existing shock and vibration isolation systems typically consist of either an elastomeric boot that is placed around the radiation detector or a foam pad that is wrapped around the radiation detector. Due to size constraints in portal monitoring radiation detectors, even these methods may not commonly be employed. In many cases, the crystal is simply wrapped in a reflective material and then inserted into a 1 mm thick stainless steel housing. The crystal is typically in the shape of a 4 inch×4 inch rectangle that is 16 inches long. Additionally, the crystal may be in other shapes, commonly including a 2 inch×4 inch rectangle that is 16 inches long.

Typically, soft elastomeric materials are used to provide cushioning, the greater the anticipated shock, the thicker the elastomer to be used. This material can be shaped in the form of boots, or sheaths, and may be achieved by potting the vibration sensitive element in an elastomer. Elastomers tend to change shape after large temperature changes due to their high coefficient of thermal expansion or due to high mechanical loading.

In one such method of building radiation detectors, a sodium iodide crystal is suspended in a metal housing a Teflon® boot. Teflon® tape is wrapped around the outside of the scintillation crystal until the dimensions match the inside of the housing. The wrapped crystal is then inserted into the housing.

Another assembly method uses foam. The sodium iodide first needs to be wrapped with a reflector to improve the internal photon reflection. After wrapping, the crystal is then packaged into the housing various systems secured inside the water resistant housing.

A larger scintillation element increases the cross-section and therefore increases the probability that a gamma ray or neutron will pass into the element. Also, a greater thickness increases the probability that the incident radiation will produce a scintillation, rather than just passing through the element. Further, the materials surrounding the scintillation crystal may attenuate the incident radiation. The thickness and characteristic of the protective materials and housing can adversely influence the sensitivity of the device.

There are numerous patents issued for various types and designs of radiation sensors utilizing the aforementioned types of suspension systems. A different concept for protection of a detector crystal incorporates the use of metallic flat springs around the circumference of a cylindrical scintillation crystal. In Frederick et al. (U.S. Pat. No. 5,962,855), a radiation detector of roughly cylindrical shape with a sidewall axial restraint surrounding the detector and radial springs placed outside the restraint provide stiff restraint in the axial and radial directions. Also in Frederick (U.S. Pat. No. 6,355,932) a first set of elongated, radial springs are located about the circumference of a light detector, radially between the housing and the light detector and a second set of similar radial springs are located about the circumference of a radiation detector where the detectors are cylindrical-shaped. These Frederick patents are assigned to General Electric and commonly employed in the manufacturing and design of cylindrical scintillation detectors for use in oil and gas exploration. However, these patents provide springs circumferentially across the entire face of the detector, thereby partially shielding the detector from incident radiation that it seeks to measure.

Accordingly, there is a need to provide a ruggedized suspension system for protecting the scintillation crystal in a square, rectangular or other polygonal shape from mechanical shock, vibration and temperature induced forces. Further is the need to provide a suspension system that minimizes shielding of the detector from the incident radiation that it seeks to measure.

BRIEF DESCRIPTION OF THE INVENTION

The present invention relates to a suspension system for protecting internal devices in an external housing and more specifically for protecting elements of a radiation detector assembly, mounted in a housing, from external shock and vibration.

Briefly in accordance with one aspect of the present invention, a suspension device is provided for holding suspension elements in place between an internal device to be suspended and an outer housing. The suspension device includes at least one tray, each tray sized to hold one suspension element and at least one retaining lip, one retaining lip attached on each side of the tray without another retaining means for the suspension element.

In accordance with another aspect of the present invention, a radiation detector assembly is provided. The radiation detector assembly includes a housing, a radiation detector element and a light detection element operationally connected to the radiation detector element. The radiation detector element is seated within the housing. The assembly also includes a plurality of continuous wave formed springs located along the outer periphery of the radiation detector element, radially between the housing and the radiation detector element.

Yet another aspect of the present invention provides a portal radiation monitor. The portal radiation monitor includes a plurality of radiation detector assemblies, each radiation detector assembly including a light detecting element and a radition detector element wherein the radiation detector element is supported a plurality of continuous wave formed springs located along the outer periphery of the light detector element, radially between a housing and the radiation detector element. The portal radiation monitor further includes a structural support for symmetrically mounting the plurality of radiation detector assemblies with respect to objects being surveyed by the portal radiation monitor. The monitor employs connecting means for connecting output radiation signals from each of the radiation detector assemblies, electronic processing means for processing output radiation signals from the plurality of raditation detector assembles; and an electronic display means for displaying the output radiation signals from the radiation detector assemblies.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein:

FIG. 2A illustrates an elevation view of the radiation detector assembly;

FIG. 2B illustrates an end view of the radiation detector assembly;

DETAILED DESCRIPTION OF THE INVENTION

Figure 1:
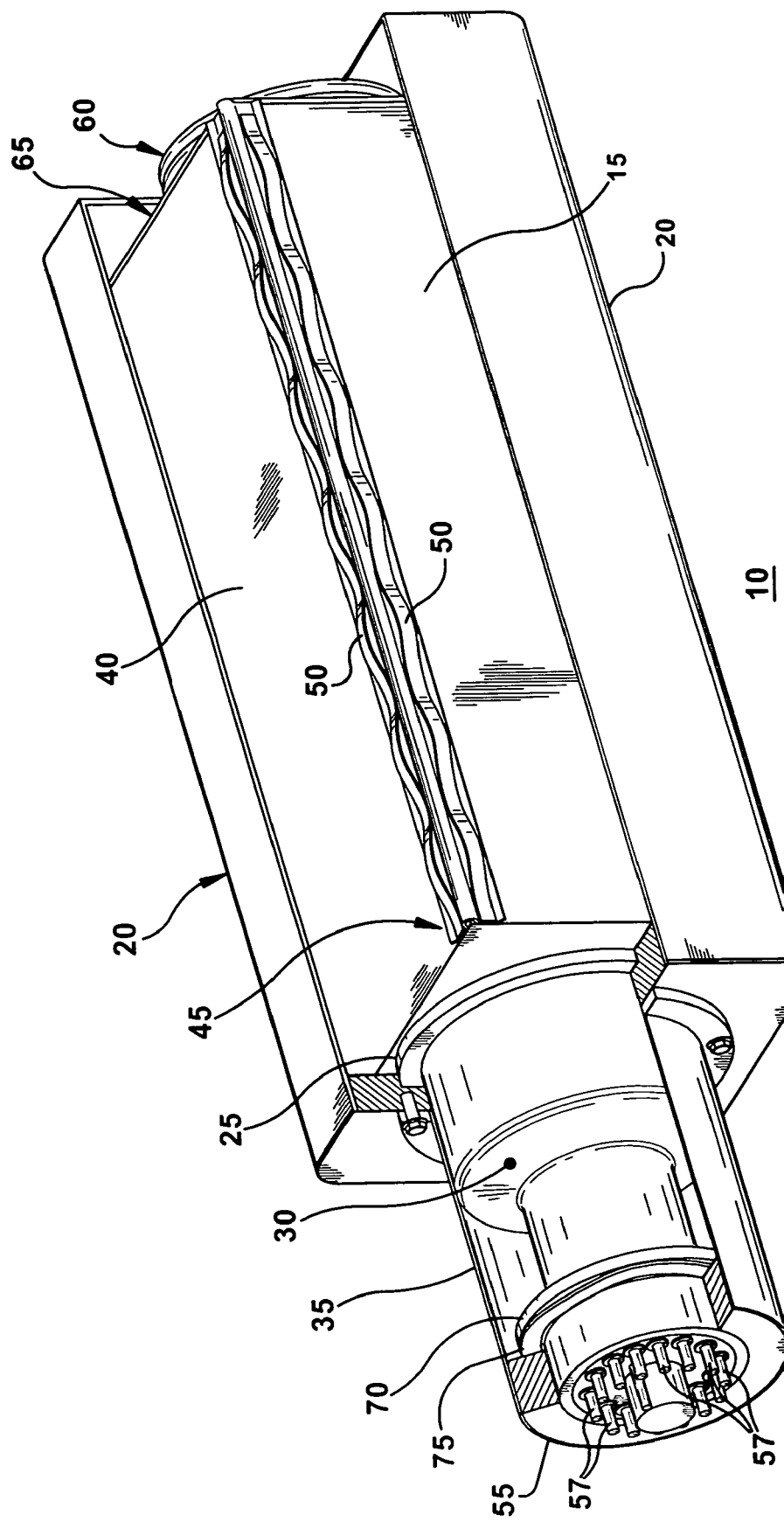
FIG. 1 illustrates an isometric cutaway view of a radiation detector assembly according to one aspect of the present invention.

The previously described methods may possibly be lacking when attempting to protect a fragile scintillation detector crystal from shock and vibration induced damage. The following embodiments of the present invention have many advantages, including providing a compact suspension system that protects internal devices from shock and vibration to which an external housing is exposed. The internal devices being protected may be varied in function, including instrumentation packages, detectors, and other sensitive equipment. The suspension system is especially suited to applications where the thickness of the volume between the internal device and the housing is limited. The internal devices being protected may also have a broad range of shapes and sizes.

The suspension element may include a range of spring-like devices, including a continuous wave formed (marcelled) suspension system. The shock and vibration applied to the detector will be transmitted through the crystal so that the crystal is moving in harmony with the detector housing and thus it will not impinge on the housing, causing damage to the crystal.

An exemplary embodiment of the present invention may relate to protection of radiation measurement devices. Radiation measurement devices often employ scintillation detectors in order to detect incident radiation. A typical radiation detector includes the following components: a scintillation crystal (usually sodium iodide doped with thallium, but not exclusively so), a photomultiplier tube (PMT), housings around each of the crystal and the PMT, and an optical window, and a suspension system inside of the housing but around the outer dimensions of the crystal and PMT. The sodium iodide crystal doped with thallium (NaI(Tl)). has been used in radiation detectors since 1920 and has well known properties for gamma sensitivity, spectral resolution, and light output. Other scintillation materials could be used such as, but not limited to, cesium iodide (CsI), Lanthanum Halides (La Halides), etc.

The crystal in an exemplary form incorporates either a rectangular or a square outer dimension for the transverse cross-section. Typical measurements for these crystals, in application as a portal detector, may be 2 in. wide×4 in. deep×16 in. long or 4 in. wide×4 in. deep×16 in. long. These particular dimensions are not exclusive, but represent the general boundaries that those knowledgeable in the art have used previously to build radiation detectors for these purposes.

The invention may be used as a gamma radiation detector. A preferred embodiment of the detector is as a gamma radiation detector inside of a housing placed near a portal through which people, vehicles, cargo, or other objects may pass. The unique properties of this detector make it ideal for portals that might see large amounts of vibration such as near trains or heavy trucks, etc. and for portable portal monitors, that may be shaken or dropped when being moved from one location to another. Individual detector element crystals may be used, in generally symmetric arrangement, around the periphery of a portal radiation sensing device, with the individual detector element crystals Continuous wave formed springs typically consist of flat metal strips bent into arches forming a continuous wave pattern along the length of the spring. This wave configuration of springs can be placed in the limited space between the radiation detector element and the housing.

The continuous wave formed springs also allow for thermal expansion of the materials when the detector is subjected to a wide temperature range. The continuous wave formed springs also allow for thermal expansion of the materials when the detector is subjected to a wide temperature range. This idea would not be limited to just sodium iodide. Other scintillation materials could be used such as CsI, La Halides, etc.

Further in various polygonal crystal arrangements for axial support, the continuous wave formed springs are placed solely at the axial edges of the scintillation crystal. Axial spring placement along the edges encumbers less of the crystal periphery than the circumferential placement of Frederick. Thus, less material, which may act as shielding for incident radiation, is placed between the outside environment being monitored and the crystal, thereby helping to maintain the sensitivity of the scintillation detector.

A first aspect of the invention provides a suspension system for holding elements in place between an internal device to be suspended and an outer housing. The suspension device includes an at least one tray, the tray being sized to hold one suspension element, and at least one retaining lip, the retaining lip attached on each side of the tray which does not have another retaining means for the suspension element. The suspension device may further include a connecting member located between the trays and attached to an adjacent edge of each tray so as to position one tray parallel to the outside periphery of the internal device to be suspended, and a second tray parallel to an adjacent section on the outside periphery of the internal device. The internal device to be suspended may include a broad range of elements that may be protected by being suspended in an outer housing, including a radiation detector element and a light detecting element.

The device to be suspended may have many shapes, which include a circular-shaped transverse cross-section, and be for example a right cylinder. The device to be suspended may also have a polygonal-shaped cross-section that can include a square, a rectangle, and a hexagon. These devices will generally be shaped as right prisms, when applied as detector elements. The suspending device may be adapted to many different shapes, including those described above. In an exemplary application where the internal device being suspended is a radiation detector element, the suspension device is referred to as a suspension guide rail.

The trays of the suspension device accommodate suspension elements that provide attenuation of shock and vibration forces imposed on the outer housing. The suspension elements supported against the internal device may include continuous wave formed springs.

A plurality of trays of the suspension device suspension device may run the axial length of the radiation detector. For a polygonal suspended device with axial edges, one tray may be positioned on each side of an axial edge of the suspended device. A connecting member may extend outward around each axial edge of the suspended device, extending the full length of the axial edge and attached to each tray running on either side of the associated axial edge. The connecting member may be in the shape of a convex loop, sized to extend around the axial edge of the internal device being suspended.

Under compression and relaxation, of shock and vibration for example, the suspension element may have a tendency to move laterally from the tray. A plurality of retaining lips may be provided to maintain the suspension element in the tray, preventing the suspension element from sliding away from the tray and associated axial edge. Retaining lips may be provided on any edge of trays that do not have another retaining means to prevent the lateral movement of the suspension element. In case of trays being positioned on each side of an axial edge of the internal device, the connecting member between the trays may serve as a means to prevent lateral movement of the suspension element toward the axial edge, so a second retaining lip is not needed in this case. However, in other applications a retaining lip may be provided on both edges of the tray.

The suspension device may be of formed sheet metal, extruded metal or an equivalent process. Plastics, ceramics or other materials may also have advantages for certain applications.

In accordance with another aspect of the present invention, an exemplary ruggedized radiation detector assembly is provided. The radiation detector assembly includes a radiation detector element and a light detection element operationally connected to the radiation detector element. The radiation detector element may have a square or rectangular shaped transverse cross-section. However the radiation detector element is not limited to these shapes, but may include polygonal and circular cross-sections (e.g. hexagonal prisms or cylinders). This assembly may include a radial suspension system to prevent damage to the fragile scintillation crystal from mechanical shock, vibration, and temperature induced forces.

The suspension element used for the radiation detector element may consist of metallic continuous wave formed springs, running along the length of the face surfaces of the scintillating crystal. These continuous wave formed springs may be made from any suitable metal or ceramic for the given application. The springs may be coated with Teflon to allow for easier movement under thermal expansion and contraction and under mechanical shock and vibration. Since the springs will be fitted along the flat faces (or tangent edge, if it is a cylinder) of the crystal and inserted into a housing, they will be under some degree of compression, thus allowing them to protect the crystal from shock and vibration.

Continuous wave formed springs may be seated in trays of the suspension device, called a suspension guide rail for the radiation detector element example. The suspension guide rail may include the trays and a retaining lip on trays with outside edges that do not include another means for retaining the springs. The continuous wave formed springs are located along the outer periphery of the radiation detector element, radially between the housing and the radiation detector element. The springs may be located axially along each face of the radiation detector element. For a cylindrical radiation detector element, the springs may be circumferentially placed around the detector element. For a detector element with a polygonal cross-section and axial edges, the springs may be located adjacent to each axial edge on each face of the radiation detector element.

Further, the springs may be placed adjacent to each axial edge and on each side of an axial edge of the radiation detector element. In this arrangement, one spring may be mounted on a tray axially along the face on one side of the axial edge and a second spring may be mounted on the tray axially along the face on the second side of the axial edge of the detector. A connecting member of the suspension guide rail may connect tray edges closest to each axial edge, extending around the edge of the detector as a convex loop, thereby helping to maintain the suspension in place at each edge of the detector.

The radiation detector assembly will also have an axial suspension system consisting of one or more axial springs mounted onto the end of the crystal. Compression plates to evenly distribute the load of the springs and the crystal will be used on either side of the springs. An axial suspension assembly will also be used around the base of the PMT. In addition to providing support against damage from shock and vibration, the axial suspension assists in maintain optical coupling between the crystal, PMT and the optical window that is between those two components.

The housing of radiation detector element may be made of a suitable material, preferably of thin-walled titanium, aluminum, or steel. The material must not unacceptably attenuate incident gamma radiation, and must also withstand the internal and external forces applied to it in typical use. Additionally, with the incorporation of the suspension system as described above, the crystal is off-set from the housing wall, thus allowing for additional protection if the side of the detector housing is impacted in some way. Finally, since the crystal is not in intimate contact with metal, but instead has a layer of air between it and the housing as an insulator, it is less likely to suffer from thermal shock as other similarly styled detectors do.

Although not shown or applied in the example above, continuous wave formed springs may also be used for suspending a photomultiplier tube (PMT). Use of continuous wave formed springs for protecting the PMT is most suitable where the available space, between an outside surface of the PMT and the inner surface of the PMT housing, is limited, the springs being adaptable to use in limited space.

In accordance with another aspect of the invention, a portal radiation monitor is provided. Radiation detector assemblies, utilizing the continuous wave formed springs for protection of the radiation detector element, may be physically mounted in a support structure to more effectively monitor an object passing through the portal. The size and orientation of the support structure and the number of radiation detector assemblies utilized may be based on the exact size and nature of the object to be monitored. The physical mounting on the support structure may utilize symmetrical mounting of individual or multiple radiation detector elements, for instance to the right and left side, and above or below the object to be surveyed. The plug package from the detector assemblies may be utilize a means for connecting output radiation signals from each of the plurality of radiation detector assemblies to an electronic processing means for processing output radiation signals from the plurality of radiation detector assemblies. An electronic display means for displaying the output radiation signals from the plurality of radiation detector assemblies may also be provided, along with an alarm to be activated if predetermined settings for radiation levels are reached. Processed radiation signals may also be stored with other data related to the objects being monitored in a data storage means. Because means for connecting, processing, displaying and storing the output radiation signals and related information are well known in the art, no further description is necessary.

FIG. 1 illustrates an isometric cutaway view of an exemplary radiation detector assembly according to one aspect of the present invention. The radiation detector assembly 10 includes a radiation detector element 15 sealed in a radiation detector housing 20, an optical window 25 placed between the radiation detector element 15 and a photomultiplier tube (PMT) 30, and a PMT housing 35. Optical couplers (not shown) are also provided between the radiation detector element 15 and the optical window 25, and the optical window 25 and the photomultiplier tube 30. The radiation detector assembly 10 further includes reflective material 40 around the radiation detector element 15, a set of suspension guide rails 45 and sets of continuous wave formed springs 50 at each axial edge of the radiation detector element 15. A plug package 55 is provided for the PMT 30 at the end of the radiation detector assembly 10 opposite to the radiation detector element 15.

FIG. 1 further illustrates elements of an exemplary axial suspension system for a radiation detector assembly 10. A compression plate 60 is provided at the detector end of the radiation detector assembly, which is biased by axial compression spring 65. A compression plate 70 at the PMT end is biased by axial compression spring 75.

FIG. 2A illustrates an elevation view of an exemplary radiation detector assembly. A transverse cross-section of the radiation detector element end of the assembly is shown. Plug package 55 provides male pins 57 for connecting a radiation output signal from the PMT (FIG. 1, 30) to an electronics system for processing and displaying the signal (not shown). PMT housing 35 seals the PMT tube end of the assembly, including the plug package 55, the PMT tube, optical window, compression plate, and axial compression spring (FIG. 1). FIG. 2B illustrates an end view of the radiation detector assembly, including the plug package 55 with male pins 57.

Figure 3:
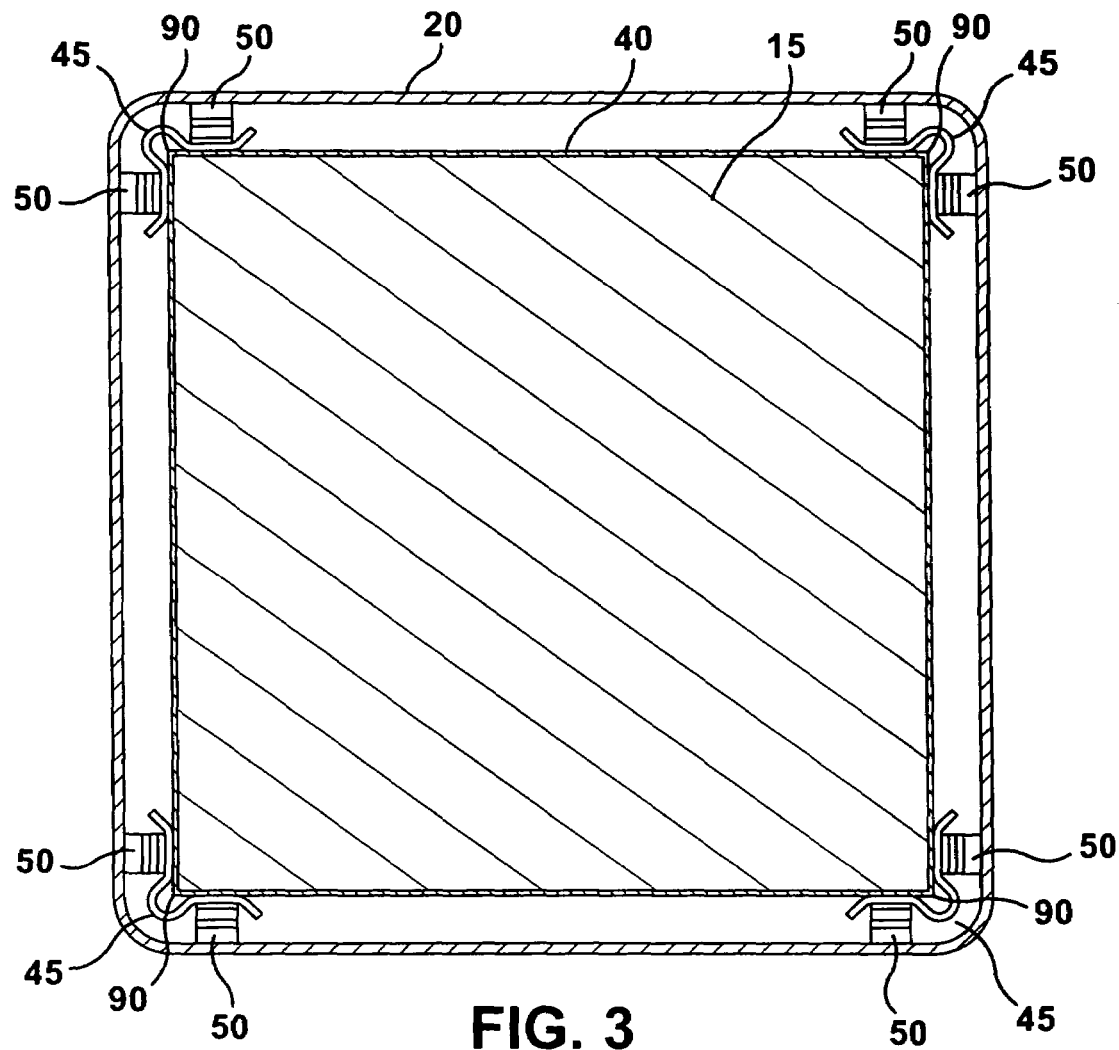
FIG. 3 illustrates a transverse cross-section of the radiation detector assembly at the radiation detector element.

FIG. 3 illustrates a transverse cross-section of an exemplary radiation detector assembly at the radiation detector element. Exemplary radiation detector element 15 is shown with a rectangular cross-section. Radiation detector element 15 is surrounded by reflective material 40. At each axial edge 90 of the radiation detector element 15, a suspension guide rail 45 is located. Two continuous wave formed springs 50 are compressed between each suspension guide rail 45 and the radiation detector housing 20.

Figure 4:
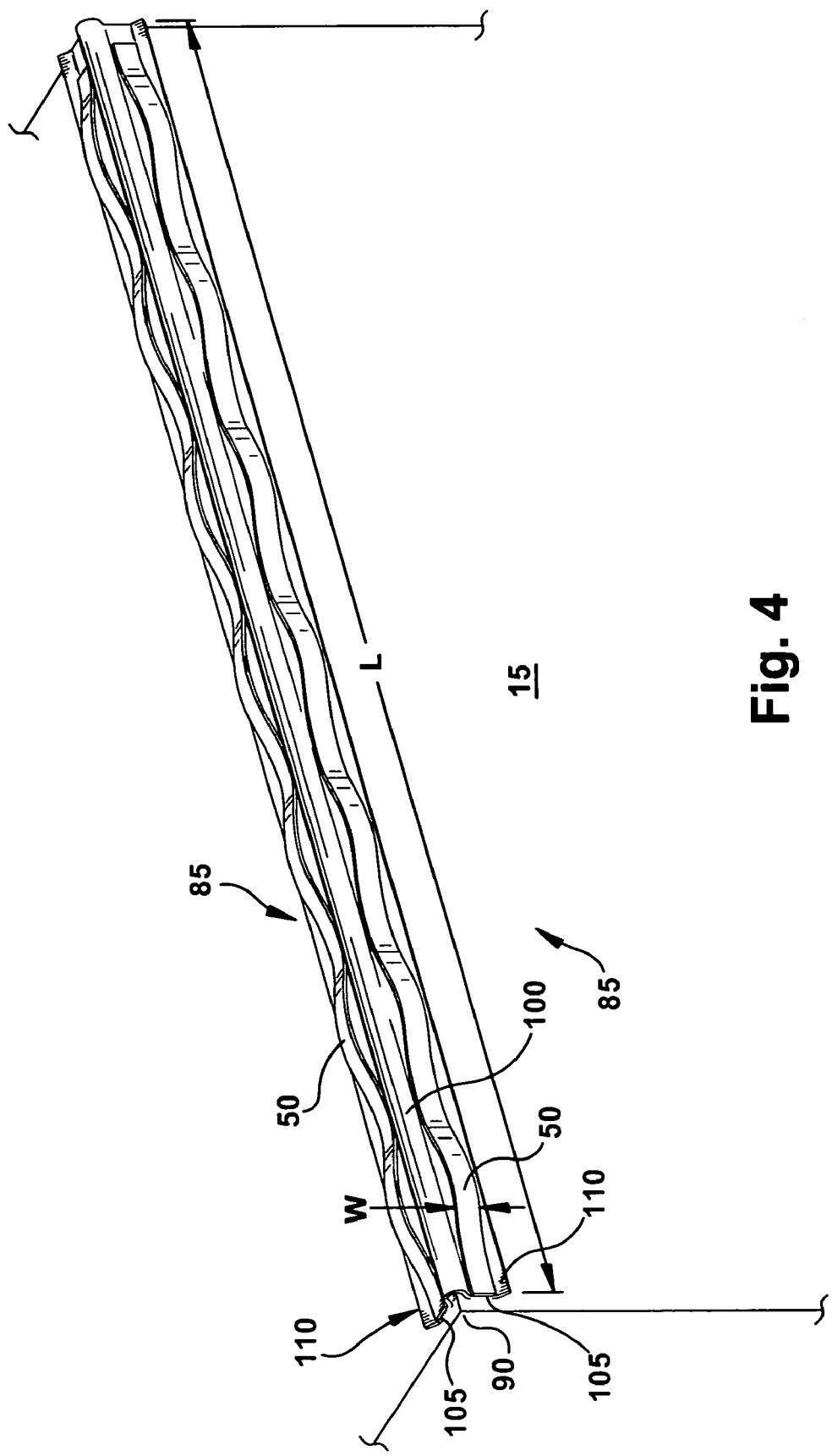
FIG. 4 illustrates an expanded isometric view of continuous wave formed springs mounted along the edge of a radiation detector element.

FIG. 4 illustrates an expanded isometric view of continuous wave formed springs mounted along the edge of an exemplary radiation detector element. Continuous wave formed springs 50 are shown along faces 85 of the radiation detector element 15 that adjoin edge 90 of the radiation detector element 15. One continuous wave formed spring 50 having width W and length L is located in each tray 105 of suspension guide rail 45. Lips 110 prevent the continuous wave formed spring 50 from sliding out from the tray when subject to compression and relaxation.

Figure 5:
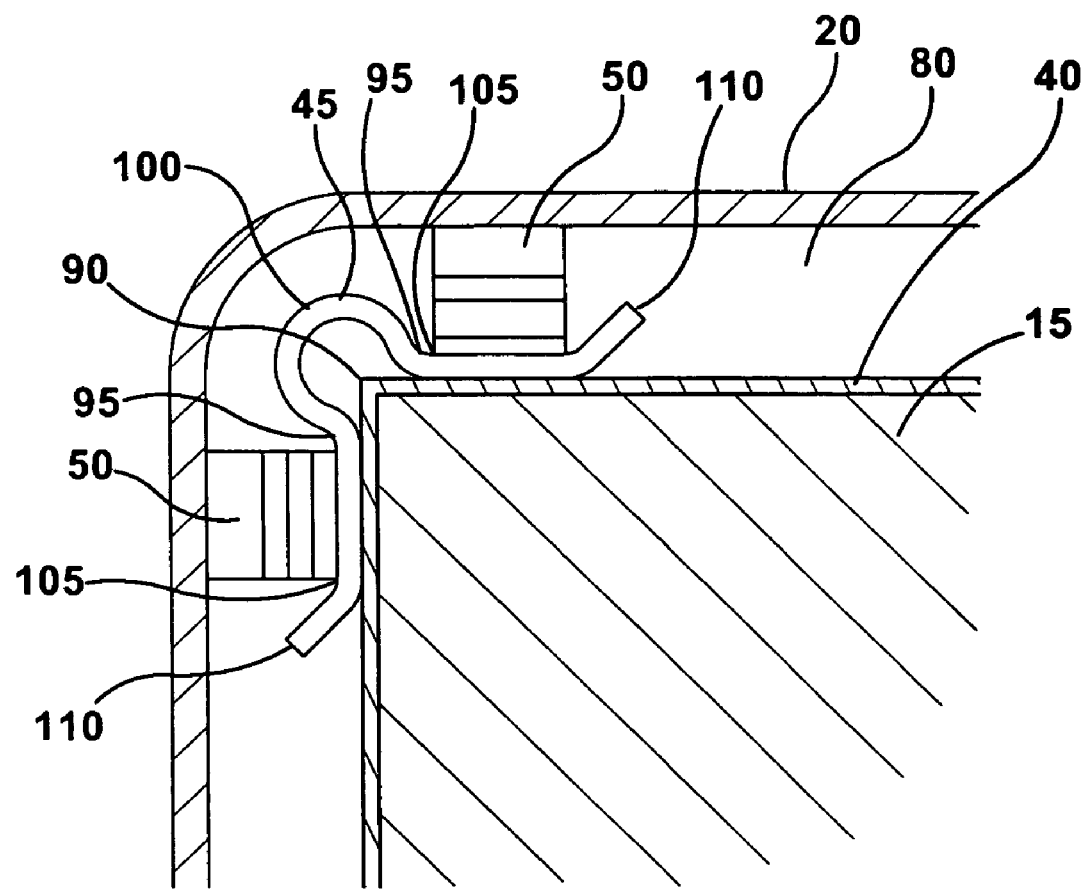
FIG. 5 illustrates an expanded view of the suspension provided for a radiation detector element at an axial edge of the element.

FIG. 5 illustrates an expanded view of the suspension provided for an exemplary radiation detector element at an axial edge of the element. A radiation detector element 15, wrapped in reflective material 40, is surrounded by radiation detector housing 20. Space 80, between the radiation detector element 15 and the radiation detector housing, is maintained by suspension guide rail 45 and continuous wave formed springs 50. The suspension guide rail 45 includes two trays 105, one on each face 85 (FIG. 4) of the radiation detection element that is adjacent to the axial edge 90 of the radiation detector element 15. Each tray is wide enough to accommodate the width W (FIG. 4) of the continuous wave formed spring 50 and extends nominally the full length of axial edge 90 of the radiation detector element 15, long enough accommodate the length L (FIG. 4) of the continuous wave formed spring 50. Each tray 105 is attached at its inside corner 95, closest to the axial edge 90 of the radiation detection element 15, to a convex loop 100, located between the trays 105. The convex loop 100 runs the full length of the suspension guide rail 45. Retaining lips 110 are attached to the trays 105 at the outside corners. Each retaining lip 110 forms an angle of about 45 degrees with respect to its associated tray 105.

While the exemplary radiation detector element is illustrated with a rectangular cross-section, the suspension system may be used in conjunction with any polygonal shaped detector, the suspension guide rail being adaptable to align the trays and hence the continuous wave formed springs flush with the faces of the detector element adjoining the common edge of the radiation detector element.

Further, the suspension guide rail may be adapted to cylindrical radiation detector elements. For cylindrical detector elements, a single tray with retaining lips on both corners may be employed to support continuous wave formed springs circumferentially around the detector along the axial tangent to the cylinder, and radially between the detector and the housing. Further, suspension guide rails may also be provided with dual trays connected by an appropriately shaped connector piece to conform the trays to curvature of the cylinder. In the cylindrical detector application, retaining lips may be provided on the corner of any tray that is not otherwise provided with a retaining means for the spring.

Figure 6:
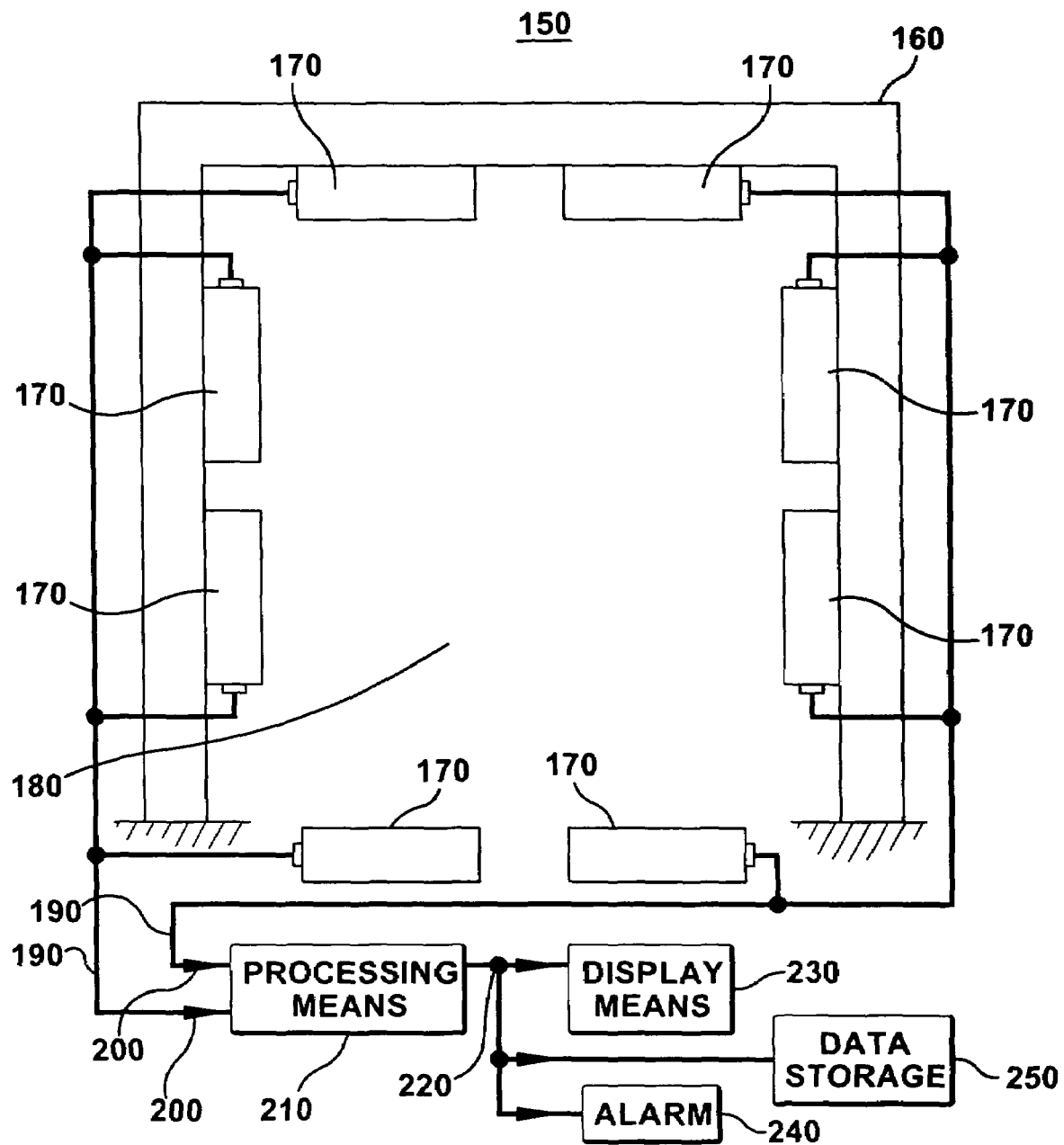
FIG. 6 illustrates an exemplary portal radiation monitor utilizing the inventive radiation detector assemblies employing a plurality of continuous wave formed springs.

FIG. 6 illustrates an exemplary portal radiation monitor utilizing radiation detector assemblies employing a plurality of continuous wave formed springs located along the outer periphery of the light detector element, radially between a housing and the radiation detector element. The portal radiation monitor 150 utilizes a plurality of radiation detector assemblies 170 mounted on a support structure 160. The support structure 160 is sized and shaped to objects to be surveyed. Multiple radiation detector assemblies 170 may be placed at physical locations on the support structure 160 to best capture the emitted radiation based on the nature of the objects passing through the portal space 180 of the portal radiation monitor 150. The exemplary arrangement of radiation detector assemblies 170 in FIG. 6 are symmetrical with respect to the portal space 180 through which the object to be surveyed is passed. The portal space 180 may be sized to monitor personal items, such as luggage; motor vehicles; trucks; cargo containers; trains; or any objects, which need to be examined for radiation emission. A means for connecting 190 is provided to connect the radiation detector output signals 200 from individual radiation detector assemblies 170 to an electronic processing means 210. The electronic processing means 210 may provide a processed radiation signal 220 to a display means 230 and for an alarm 240. A data storage means 250 may be used to store processed radiation signals 250 and other information elements (not shown) related to the objects being monitored.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A suspension arrangement, adapted for providing shock protection to an internal device suspended within an outer housing, comprising:
   an internal device;
   an outer housing;
   at least one shock-absorbing suspension element;
   at least one tray, wherein each tray is sized to hold one shock-absorbing suspension element and is positioned between the internal device and the outer housing, and is further positioned outside the shock-absorbing suspension element, holding the shock-absorbing suspension element engaged with the internal device; and
   at least one retaining lip on the at least one tray, wherein the at least one retaining lip is attached on each side of the tray that does not provide another retaining means for the shock-absorbing suspension element.

2. The suspension arrangement as claimed in claim 1, further comprising:
   a first tray and a second tray of the at least one tray; and
   a connecting member located between the first tray and the second tray, wherein the connecting member is attached to adjacent edges of the first tray and the second tray in a way to position the first tray parallel to a first axial surface of the internal device and to position the second tray parallel to an adjacent second axial surface of the internal device.

3. The suspension arrangement as claimed in claim 2, wherein the connecting member comprises a convex loop extending around an axial edge of the internal device.

4. The suspension arrangement as claimed in claim 3, wherein the shock-absorbing suspension element comprises continuous wave formed springs.

5. The suspension arrangement as claimed in claim 4, wherein the internal device comprises a radiation detector element.

6. The suspension arrangement as claimed in claim 5, further comprising:
   a plurality of trays running an axial length of the radiator detector element, wherein a first tray is positioned on a first axial surface of the radiation detector element adjacent to an axial edge and a second tray is positioned on a second axial surface of the radiation detector element adjacent to the same axial edge;
   a connecting member extending outward around the axial edge of the radiation detector element and forming a connection between an adjacent edge of the first tray with an adjacent edge of the second tray, the connection extending substantially along the axial edge of the radiation detector element; and
   a plurality of retaining lips, wherein a first retaining lip attaches to an edge of the first tray outboard from the connecting member and a second retaining lip attaches to an edge of the second tray outboard from the connecting member.

7. The suspension arrangement as claimed in claim 6, wherein the transverse cross-section of the radiation detector element is circular.

8. The suspension arrangement of claim 6, wherein the transverse cross-section of the radiation detector element is polygonal.

9. The suspension arrangement as claimed in claim 6, wherein the transverse cross-section of the radiation detector element is rectangular.

10. The suspension arrangement as claimed in claim 6, wherein the continuous wave formed springs comprise formed sheet metal.

11. The suspension arrangement as claimed in claim 6, wherein the continuous wave formed springs comprise extruded metal.

* * * * *